Patented July 20, 1943

2,324,518

UNITED STATES PATENT OFFICE 2,324,518

PROCESS OF CARRYING OUT REACTIONS WITH CARBONACEOUS MATERIALS

Hans Klein, Mannheim, Rudolf Seidler, Heidelberg, and Fritz Stoewener, Ludwigshafen-on-the-Rhine, Germany; vested in the Alien Property Custodian No Drawing. Application October 23, 1940, Serial No. 362,406. In Germany June 8, 1939

8 Claims. (Cl. 196—52)

The present invention relates to a process for the production of hydrocarbon oils by a thermal treatment of carbonaceous materials.

We have found that in the cracking or in similar treatments of hydrocarbon oils or in the destructive hydrogenation of coals, tars and mineral oils particularly high yields of valuable hydrocarbon oils are obtained when operating in the presence as a catalyst of a silica gel, containing or not a metal oxide, which, after removing the air from its pores by treating with gaseous or vaporous substances readily soluble in water, is soaked or impregnated with an aqueous metal salt solution, then washed and heated.

The silica gel may be prepared in any desired manner, for example from alkali metal silicate solutions, by acidifying and drying and heating the jelly obtained. The silica gel may also be prepared by adding aqueous solutions of metal salts, as for example of aluminum or magnesium, to alkali metal silicate solutions or to silica sols, so that the finished gel contains metal oxide.

For removing the air from the pores of the silica gel gases or vapors are used which are readily soluble in water, as for example gaseous ammonia, water vapor, hydrogen sulphide, sulphur dioxide, gaseous or vaporous amines, as for example methylamine and the like. These air-removing agents are allowed to act upon the silica gel at ordinary or elevated temperature which must be so high that the said agents are in the gaseous or vaporous state. The treatment generally lasts for from a couple of minutes to about an hour. It is advantageous not to extend the treatment of the silica gel for so long as to cause substantial changes therein, for example swelling.

The silica gel so treated is then contacted with an aqueous solution of a metal salt. The air-removing agent contained in the pores of the gel may then act as a precipitant. As preferred metal salt solutions may be mentioned aqueous solutions of salts of the metals of the second to the eighth group of the periodic system, especially of aluminum, magnesium, zinc, tin, titanium, thorium, chromium, molybdenum, tungsten, vanadium, iron, cobalt or nickel. The silica gel may be treated with several metal salt solutions successively, with a treatment with air-removing agents being intercalated, if so desired, between the different stages of treatment.

The catalyst so obtained is washed, dried and heated, for example up to temperatures of 300° C. or more, for instance to from 500° to 800° C. The catalyst retains its activity for a long time and may frequently be regenerated without suffering any marked decrease of its catalytic activity.

The catalyst is especially suitable for use in the vapor-phase cracking of hydrocarbon oils from low-boiling hydrocarbons, in which treatment it offers the great advantage that there occurs only a slight formation of gas. Such cracking process is usually carried out at a temperature above 300° C., preferably at from about 400° to about 550° C. The operation may also be carried out under increased pressure, for instance 10 at to 200 at or more, in which case it may be preferable to work in the liquid phase. The catalysts are but rigidly arranged in the reaction vessel.

The following examples serve to illustrate how the present invention may be carried out in practice, but the invention is not restricted to the said examples.

Example 1

200 cubic centimeters of a granular large-pored silica gel are treated with gaseous ammonia until 4.4 grams of ammonia have been taken up, which generally takes from 5 to 10 minutes. Thereafter, a solution of 60 grams of aluminum nitrate in 120 cubic centimeters of water is added to the gel and the whole allowed to stand for an hour, whereupon the catalyst is washed until the washing water does no longer show the nitrate reaction. The mass is then dried at 130° C.

For comparison 200 cubic centimeters of the same silica gel (not treated with ammonia gas) are contacted with a solution of 60 grams of aluminum nitrate in 120 cubic centimeters of water, but 40 cubic centimeters of concentrated aqueous ammonia are added after 30 minutes and after another 60 minutes the catalyst is washed as above.

When a middle oil from a German mineral oil is passed over at a rate of 1 liter of oil per hour and per liter of catalyst and at a temperature of 450° C., the former catalyst yields 30 per cent of gasoline, while the catalyst serving for comparison only yields 25 per cent of gasoline. Besides, the yield of gasoline obtained by means of the former catalyst was the same as at the start even after 21 hours' pauseless operation with the temperature being gradually raised by 20° C., while the latter catalyst suffered a marked decrease in activity during the same time. When the former catalyst falls off in activity, its original activity may easily be restored by regeneration.

Example 2

200 grams of a silica gel catalyst containing from 90 to 93 grams of SiO₂ and from 10 to 7 grams of Al₂O₃ which only yields from 15 to 20 per cent of gasoline under the conditions specified in Example 1, are laden with 2.2 grams of gaseous ammonia, whereupon a solution of 30 grams of aluminum nitrate in 60 cubic centimeters of water is added. After one hour's standing the catalyst is washed until the washing water no longer shows the nitrate reaction. The mass is then dried at 130° C.

When used under the conditions specified in Example 1, the catalyst treated in the said manner yields 30 per cent of gasoline. Even when used in prolonged operation, this catalyst retains its superiority to the untreated one.

What we claim is:

1. A process for the production of a hydrocarbon oil by the thermal treatment of a carbonaceous material at a temperature above 300° C. in the presence of a catalyst which comprises employing a catalyst obtained by removing the air from the pores of a silica gel by means of a gaseous substance readily soluble in water, then treating the gel with an aqueous solution of a salt of a polyvalent metal which salt is capable of conversion to the corresponding oxide, washing and drying the mass.

2. A process as claimed in claim 1, in which the catalyst is obtained from a silica gel prepared from an alkali-metal silicate solution with an addition of a solution of a salt of aluminum.

3. A process as claimed in claim 1, in which the catalyst is obtained from a silica gel prepared from a silicic acid sol with an addition of a solution of a salt of aluminum.

4. A process as claimed in claim 1, in which the catalyst is obtained with gaseous ammonia as the air-removing agent.

5. A process of cracking a hydrogen oil at a temperature above 300° C. in the presence of a catalyst which comprises employing a catalyst obtained by removing the air from the pores of a silica gel by means of a gaseous substance readily soluble in water, then treating the gel with an aqueous solution of a salt of a polyvalent metal which salt is capable of conversion to the corresponding oxide, washing and drying the mass.

6. A process for the destructive hydrogenation of a carbonaceous material at a temperature above 300° C. in the presence of a catalyst which comprises employing a catalyst obtained by removing the air from the pores of a silica gel by means of a gaseous substance readily soluble in water, then treating the gel with an aqueous solution of a salt of a polyvalent metal which salt is capable of conversion to the corresponding oxide, washing and drying the mass.

7. The process as defined in claim 1 in which the catalyst is obtained from a silica gel prepared from an alkali metal silicate solution with an addition of a solution of a salt of magnesium.

8. The process as defined in claim 1 in which the catalyst is obtained from silica gel prepared from a silicic acid sol with an addition of a solution of a salt of magnesium.

HANS KLEIN.
RUDOLF SEIDLER.
FRITZ STOEWENER.